United States Patent
Yoshigai (12)

(10) Patent No.: US 6,328,139 B1
(45) Date of Patent: Dec. 11, 2001

(54) CONNECTION DEVICE OF BICYCLE BRAKE CABLE

(75) Inventor: Kozo Yoshigai, Nara (JP)

(73) Assignee: Dia_Compe, Taiwan, Co. LTD (TW)

( * ) Notice: Subject to any disclaimer, the term of this patent is extended or adjusted under 35 U.S.C. 154(b) by 0 days.

(21) Appl. No.: 09/489,940

(22) Filed: Jan. 24, 2000

(51) Int. Cl.⁷ .................................................... F16C 1/10
(52) U.S. Cl. ..................... 188/24.22; 74/502.4; 188/24.11
(58) Field of Search .............................. 188/24.11, 24.22, 188/2 D; 74/502.4, 489, 502.2

(56) References Cited

U.S. PATENT DOCUMENTS

| | | | |
|---|---|---|---|
| 5,144,856 | * | 9/1992 | Roca ................................... 74/502.4 |
| 5,545,982 | * | 8/1996 | Vlakancic .......................... 188/24.22 |
| 5,664,462 | * | 9/1997 | Reasoner ............................. 74/504.4 |
| 5,799,544 | * | 9/1998 | Ooa ..................................... 74/502.4 |
| 5,946,978 | * | 9/1999 | Yamashita .......................... 188/24.11 |

OTHER PUBLICATIONS

Kupfrian Flexible Shafts, Bulletin 5194 Apr. 11, 1952.*

* cited by examiner

*Primary Examiner*—Matthew C. Graham
(74) *Attorney, Agent, or Firm*—Browdy and Neimark

(57) ABSTRACT

A bicycle cable connection device is designed to connect a tube lashing seat of the bicycle and an outer tube enclosing the bicycle brake cable. The connection device comprises a pliable tube, a tube sleeve, and an adjustable member. The pliable tube has a predetermined length and encloses the bicycle brake cable. The tube sleeve is connected with the adjustment member and the pliable tube. The adjustment member is connected with the outer tube. The connection device is mounted in such a manner that the adjustment member does not obstruct other component parts of the bicycle.

3 Claims, 6 Drawing Sheets

CONNECTION DEVICE OF BICYCLE BRAKE CABLE

FIELD OF THE INVENTION

The present invention relates generally to a bicycle brake cable, and more particularly to a device for connecting the bicycle brake cable.

BACKGROUND OF THE INVENTION

There are a variety of bicycles, which are designed to meet various purposes. The case in point is an acrobatic bicycle as shown in FIG. 1. The acrobatic bicycle has a brake lever 1 which is located under the handlebar 2. In addition, the bicycle has a U-shaped tube 3 fastened between the two handlebars 2. The handlebars 2 are provided with a tube lashing seat 4 on which an adjustment member 5 is mounted, as shown in FIG. 2. The adjustment member 5 is used to adjust the holding force of the brake lever 1. The adjustment member 5 has an action rod 5a which is connected at the front segment thereof with one end of an outer tube 7 which is intended to protect a brake cable 6. The action rod 5a is provided with a sunken hole 5b enabling the action rod 5a to engage securely with the outer tube 7. The action rod 5a is therefore extended outward to a certain extent. In view of the adjustment member 5 being contiguous to the U-shaped tube 3, the adjustment member 5 and the tube lashing seat 4 are crammed in a limited space available between the adjustment member 5 and the U-shaped tube 3. The space problem becomes acute if the handlebars 2 are shortened. In light of the space problem described above, the adjustment member 5 can not be installed and adjusted with ease and speed. The bicycles of other types also have the similar problem.

SUMMARY OF THE INVENTION

It is therefore the primary objective of the present invention to provide a bicycle brake cable connection device which is so designed as to enable the adjustment member to be located at an optimal position.

It is another objective of the present invention to provide a bicycle brake cable connection device which can be easily installed and adjusted.

The foregoing objectives of the present invention are attained by a bicycle brake cable connection device which is used to connect the tube lashing seat and an outer tube sheathing the bicycle brake cable. The connection device comprises a pliable tube, a tube sleeve, and an adjustment member. The pliable tube encloses the brake cable and has a predetermined length. The pliable tube can be bent as desired. The tube sleeve is joined with one end of the pliable tube and is contiguous to the outer tube. The adjustment member is fastened with the tube sleeve and is located between the tube sleeve and the outer tube. The adjustment member is intended to adjust the clamping force at the time when the brake is applied.

DETAILED DESCRIPTION OF THE INVENTION

Figure 1:
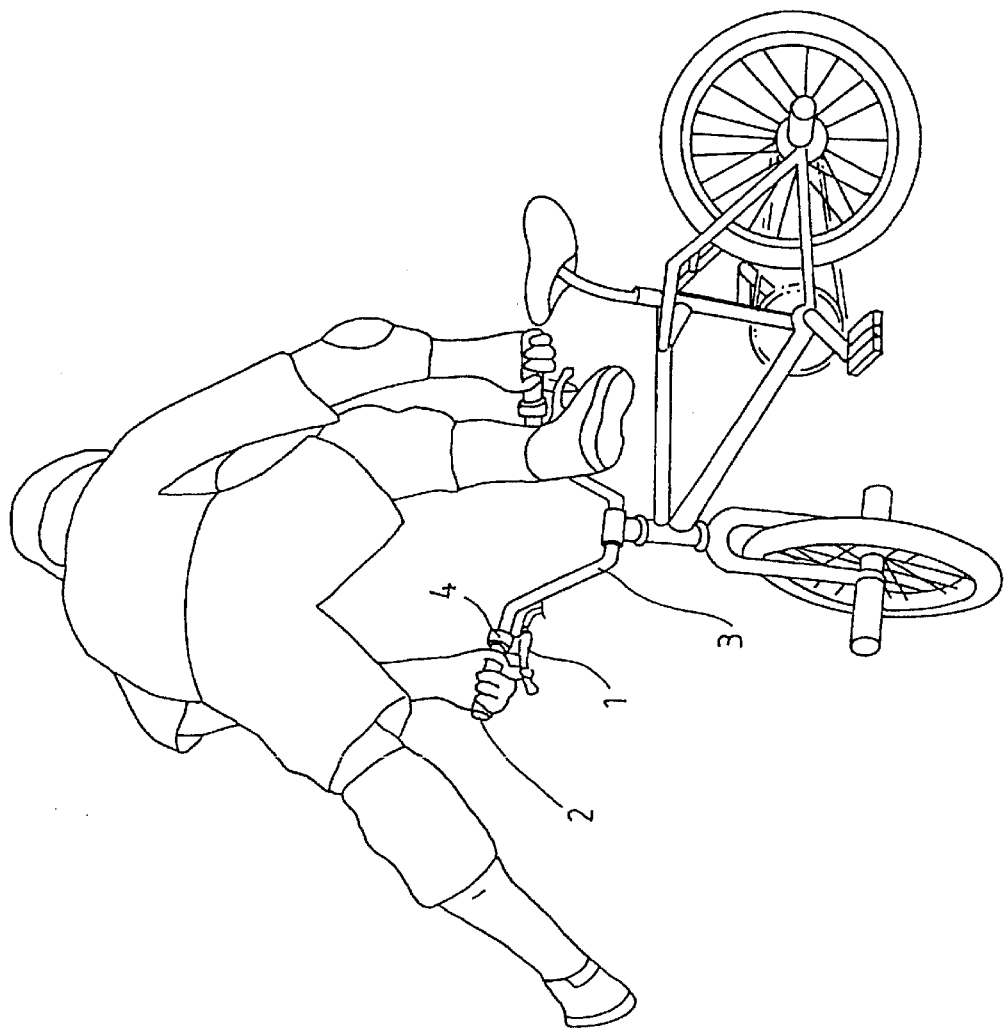
FIG. 1 shows a schematic view of a prior art bicycle in action.
Figure 2:
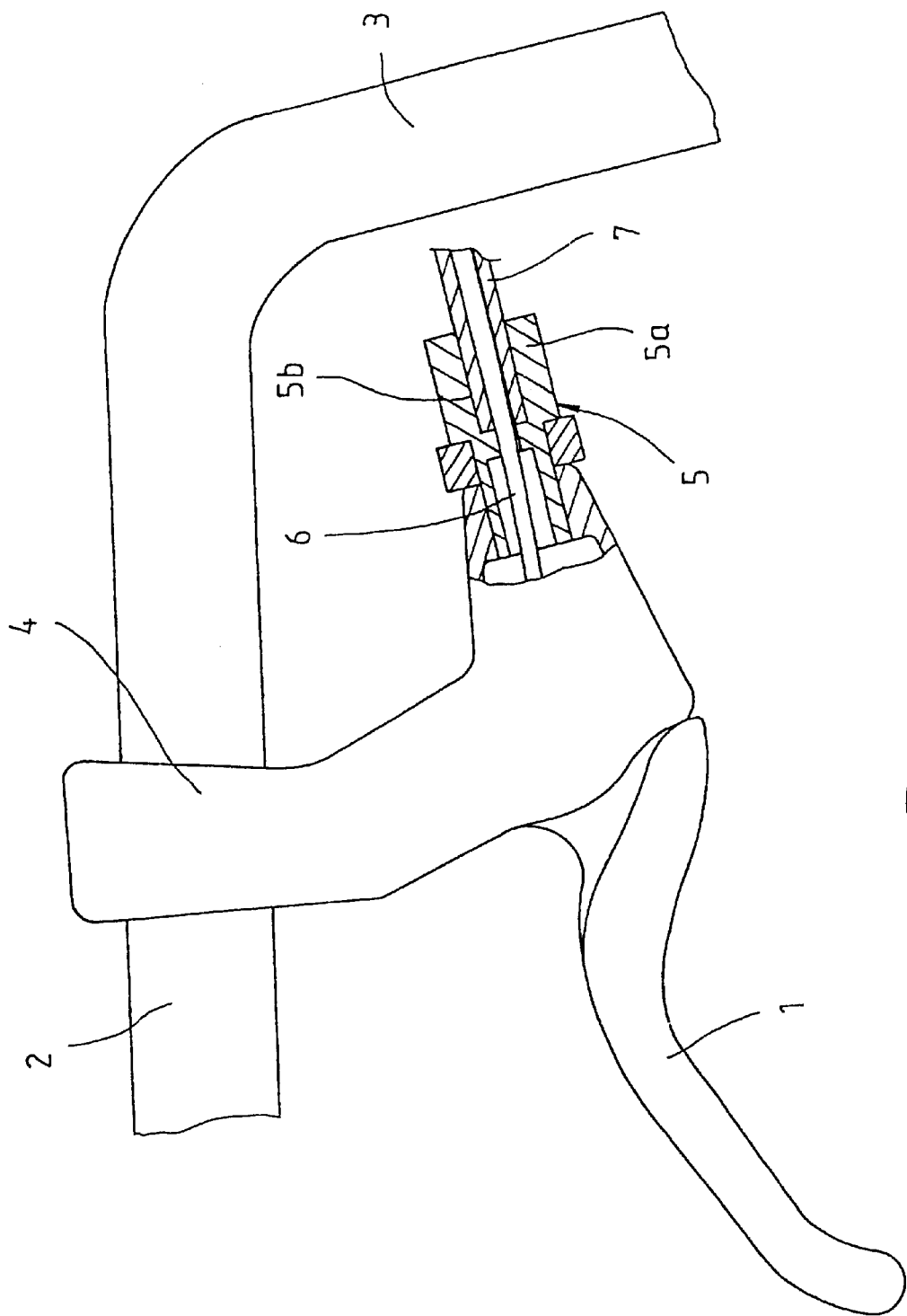
FIG. 2 shows a partial sectional view of a bicycle braking member the prior art.
Figure 3:
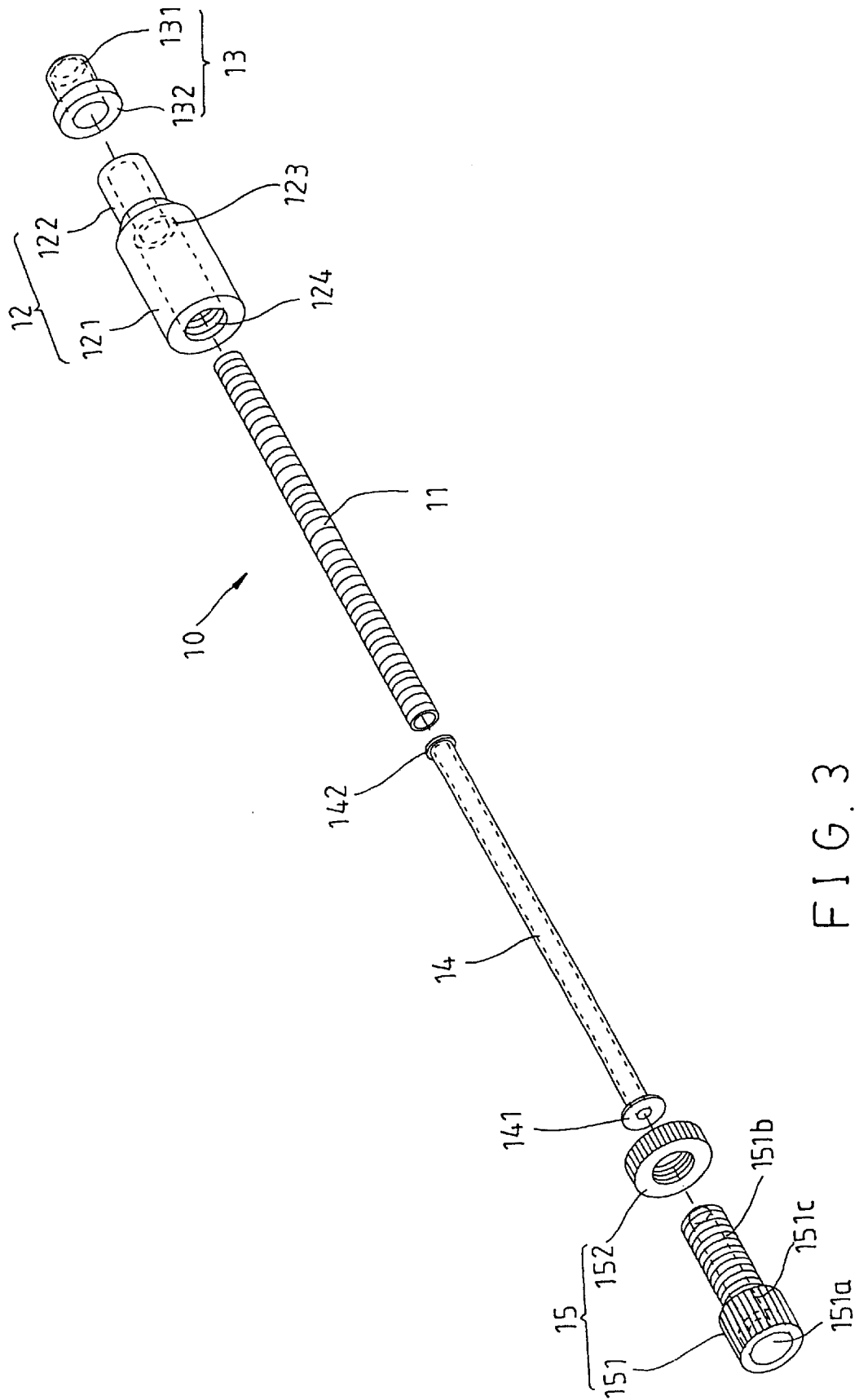
FIG. 3 shows an exploded view of a preferred embodiment of the present invention.
Figure 4:
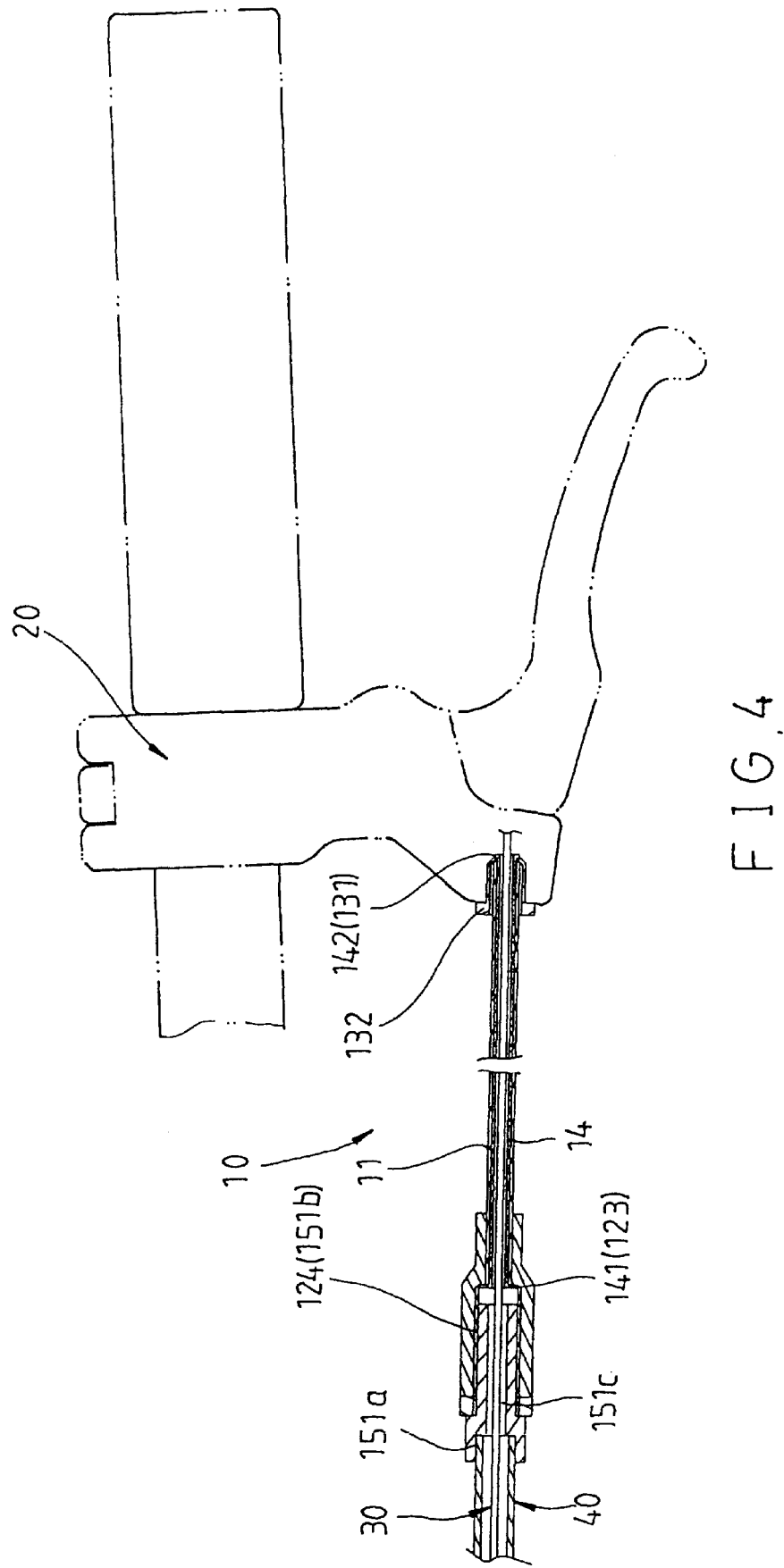
FIG. 4 shows a sectional view of the preferred embodiment of the present invention in combination.

As shown in FIGS. 3 and 4, a bicycle brake cable connection device 10 embodied in the present invention is used to connect a tube lashing seat 20 with an outer tube 40 enclosing a bicycle brake cable 30. The connection device 10 comprises a pliable tube 11, a tube sleeve 12, a guide socket 13, a protective tube 14, and an adjustment member 15.

The pliable tube 11 is made of a metal material and is of a hollow serpentine construction. The pliable tube 11 has a predetermined length and can be bent as desired.

The tube sleeve 12 is fastened with the pliable tube 11 and is contiguous to one end of the outer tube 40. The tube sleeve 12 has a first connection tube 121 and a second connection tube 122 smaller in diameter than the first connection tube 121. Located between the first connection tube 121 and the second connection tube 122 is converging portion which is provided therein with a shoulder 123. The first connection tube 121 is provided with a threaded hole 124. The second connection tube 122 has a tube diameter cooperative with the outer diameter of the pliable tube 11.

The guide socket 13 is of a hollow cylindrical construction and is fitted over the pliable tube 11 such that the guide socket 13 is contiguous to one end of the tube lashing seat 20. The guide socket 13 has one end which is smaller in diameter and is provided with a stop side 131 for preventing the guide socket 13 from sliding downward along the pliable tube 11. The guide socket 13 is provided at other end thereof with an enlarged arresting side 132, which urges the tube lashing seat 20.

The protective tube 14 is made of a plastic material and is of a hollow construction. The protective tube 14 is fitted into the pliable tube 11. The protective tube 14 encloses the brake cable 30. The protective tube 14 is provided at both ends thereof with a first stop edge 141 and a second stop edge 142. The first stop edge 141 presses against the shoulder 123 of the tube sleeve 12, whereas the second stop edge 142 presses against the outer edge of the stop side 131 of the guide socket 13. The tube sleeve 12 and the guide socket 13 are thus located.

The adjustment member 15 is composed of an action rod 151 and a fastening block 152. The action rod 151 has a sunken hole 151a, and an outer threaded segment 151b which is provided with an axial hole 151c in communication with the sunken hole 151a. The action rod 151 is fastened with the tube sleeve 12 such that the outer threaded segment 151b of the action rod 151 is engaged with the threaded hole 124 of the tube sleeve 12, and that one end of the outer tube 40 is inserted into the sunken hole 151a. The fastening block 152 is connected with the outer threaded segment 151b before the action rod 151 is assembled.

As shown in FIGS. 3 and 4, the protective tube 14 is initially provided at one end thereof with a first stopping edge 141. The second connection tube 122 is subsequently connected with one end of the pliable tube 11. In the meantime, the outer end of the pliable tube 11 is fastened with guide socket 13. The protective tube 14 is fitted in sequence into the tube sleeve 12, the pliable tube 11, and the guide socket 13 such that the first stopping edge 141 presses against the shoulder 123 of the tube sleeve 12, and that other end of the protective tube 14 emerges from the guide socket 13 to form a second stopping edge 142 by heating and pressing. As a result, the protective tube 14 is received in the pliable tube 11. The tube sleeve 12 and the guide socket 13 are thus confined. Finally, the action rod 151 is fastened with the tube sleeve 12 such that the outer threaded segment 151*b* of the action rod 151 is engaged with the threaded hole 124 of the tube sleeve 12.

The connection device 10 is mounted on a bicycle such that the brake cable 30 is received in the protective tube 14, the tube sleeve 12, and the axial hole 151*c* of the action rod 151. Thereafter, the connection device 10 is displaced upwards along the brake cable 30 such that the arresting side 132 of the guide socket 13 comes in contact with the tube lashing seat 20. Finally, one end of the outer tube 40 is inserted into the sunken hole 151*a* of the action rod 151.

Figure 5:
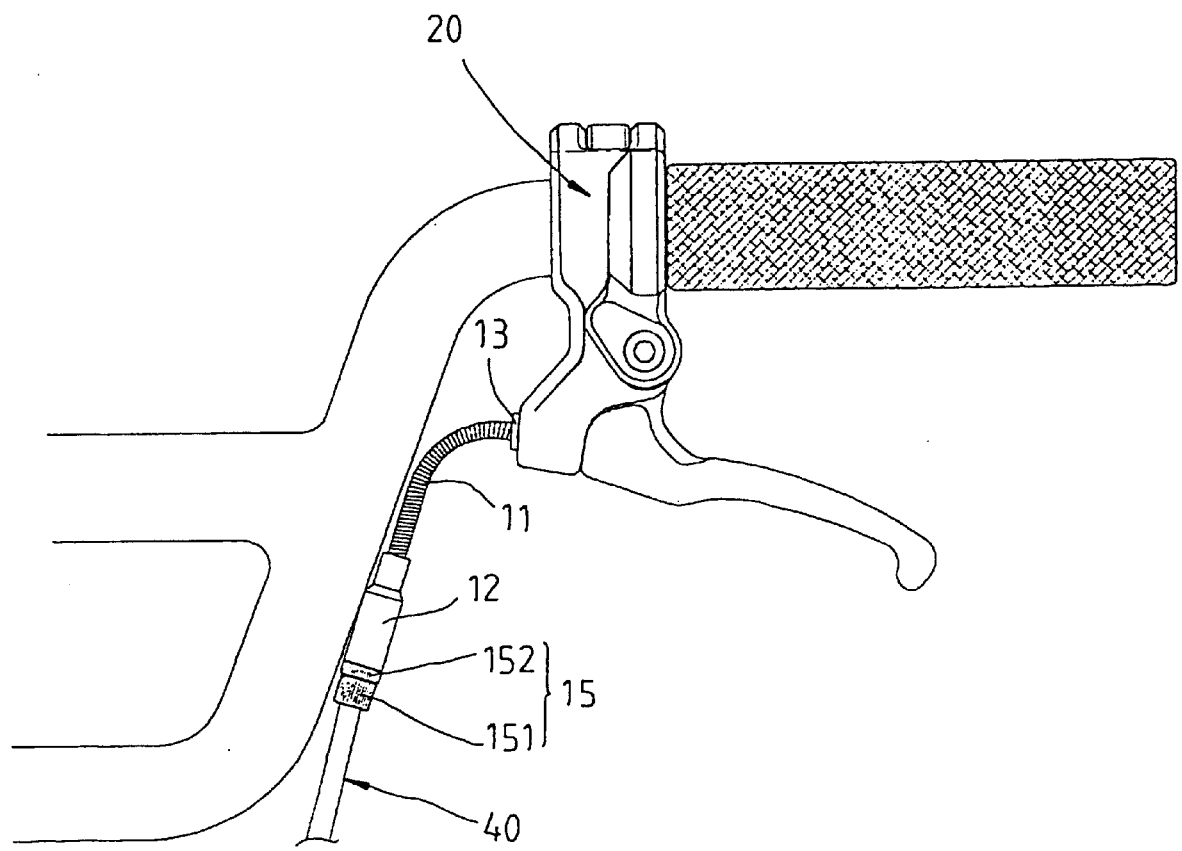
FIG. 5 shows a schematic view of a first application of the present invention.
Figure 7:
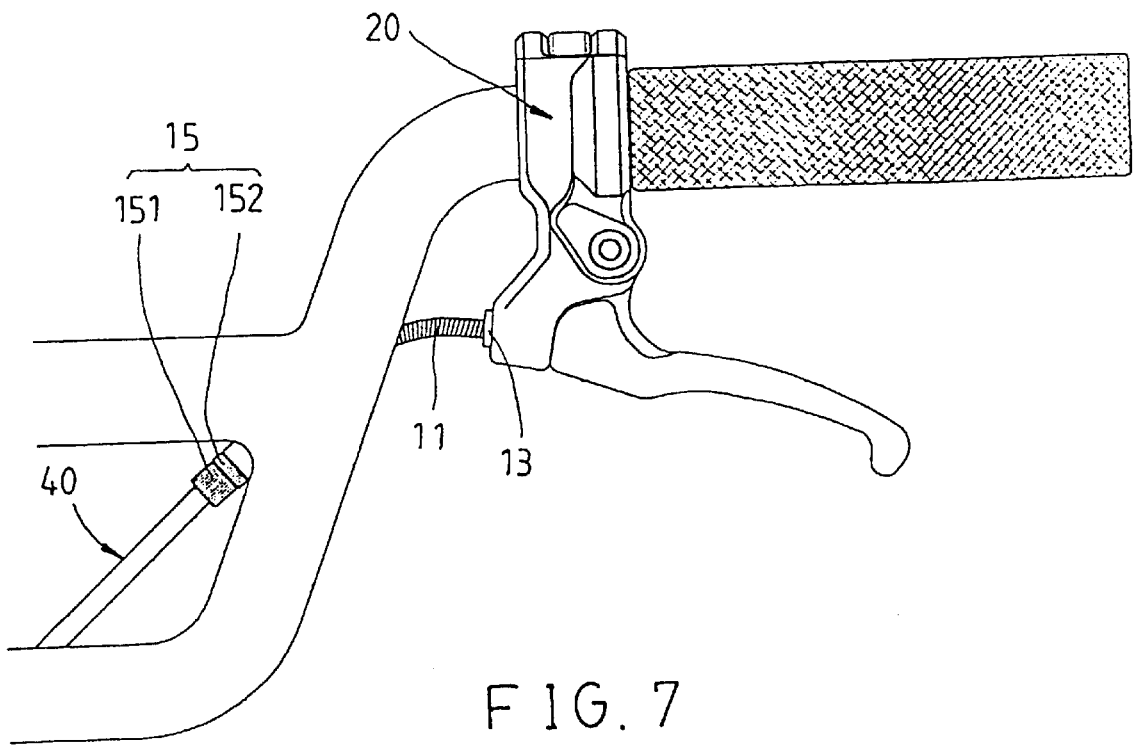
FIG. 7 shows a schematic view of a third application of the present invention.
Figure 6:
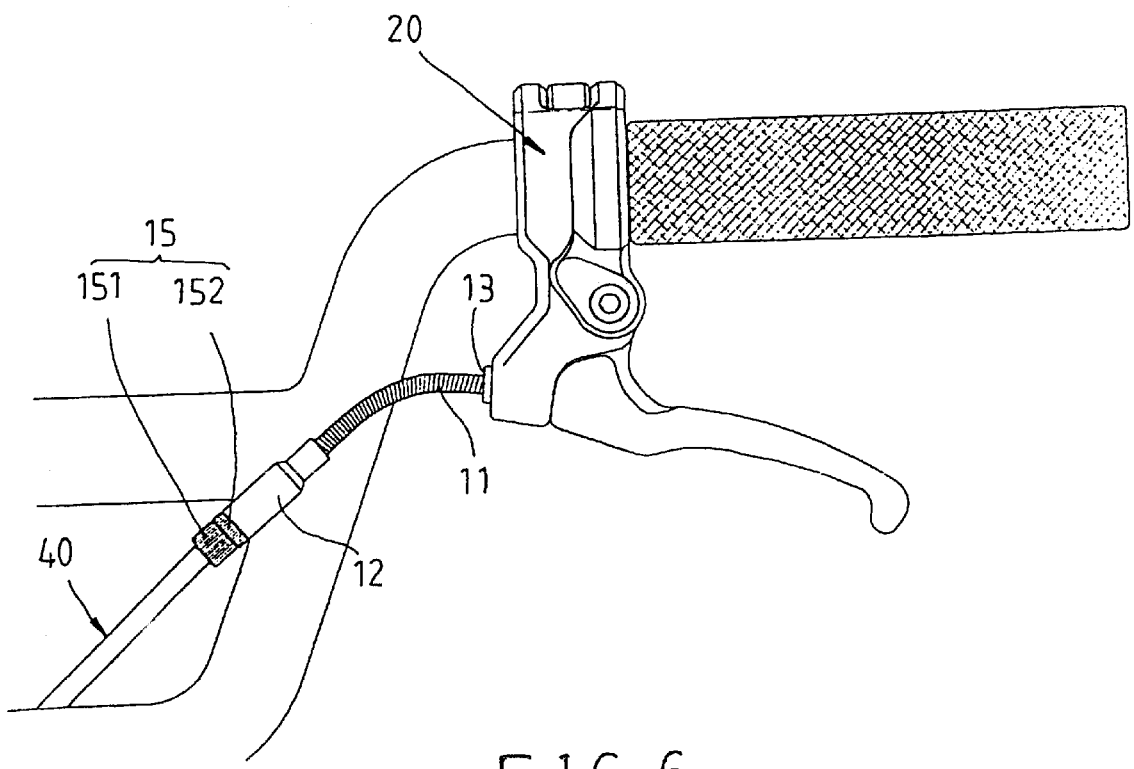
FIG. 6 shows a schematic view of a second application of the present invention.

In light of the pliable tube 11, the connection device 10 has a predetermined length and can be bent as desired. The pliable tube 11 is provided at the outer end thereof with the adjustment member 15 and the tube sleeve 12. When the connection device 10 is mounted on a bicycle, the connection device 10 is flexibly mounted, depending on the design of the handlebar support, on an appropriate position to avert the likelihood that the connection device 10 interferes with the tube sleeve 12 and the adjustment member 15 which is used to adjust the holding force of the brake lever. Now referring to FIGS. 5, 6, and 7, in view of the flexible characteristic of the pliable tube 11 and the adjustment member 15 being mounted independently at a position away from the outer end of the tube lashing seat 20, the adjustment member 15 is mounted at the optimal position along the U-shape tube of a bicycle, regardless of the construction design of the bicycle.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A bicycle brake cable connection device for connecting a bicycle tube lashing seat and an outer tube enclosing the bicycle brake cable, said connection device comprising:

a pliable tube of a hollow construction and enclosing the bicycle brake cable whereby said pliable tube has a predetermined length and can be bent as desired;

a tube sleeve connected with one end of said pliable tube, said one end of said pliable tube being contiguous to the outer tube enclosing the bicycle brake cable; and and adjustment member connected with said tube sleeve and located between said tube sleeve and said outer tube whereby said adjustment member is used to adjust the holding force of a brake lever fastened with one end of the bicycle brake cable; and wherein said tube sleeve has a threaded hole; and wherein said adjustment member is formed of an action rod and a fastening block, said action rod being provided with a sunken hole in which one end of the outer tube is received, said action rod further being provided with an outer threaded segment whereby said fastening block of said adjustment member is fastened on said outer threaded segment engaging said threaded hole of said tube sleeve.

2. The connection device as defined in claim 1 further comprising a protective tube fitted into said pliable tube such that the bicycle brake cable is put through said protective tube.

3. The connection device as defined in claim 1, wherein said pliable tube is engaged at one end thereof with a hollow guide socket urging a bicycle tube lashing seat whereby said one end of said pliable tube is contiguous to the bicycle tube lashing seat.

* * * * *